(12) United States Patent
Hood

(10) Patent No.: US 6,644,807 B1
(45) Date of Patent: Nov. 11, 2003

(54) EYEGLASS TEMPLE HOLDERS FOR ATTACHING TO OPPOSITE SIDES OF HEADWEAR

(76) Inventor: David M. Hood, 16996 E. Piedmont, Unit D, Aurora, CO (US) 80015

(*) Notice: Subject to any disclaimer, the term of this patent is extended or adjusted under 35 U.S.C. 154(b) by 0 days.

(21) Appl. No.: 10/385,825

(22) Filed: Mar. 10, 2003

(51) Int. Cl.[7] ................................................. G02C 5/22
(52) U.S. Cl. ............................................ 351/155; 2/10
(58) Field of Search ............................... 351/155, 140, 351/158, 41; 2/10, 12, 13; 24/3.3

(56) References Cited

U.S. PATENT DOCUMENTS

| | | | | |
|---|---|---|---|---|
| 4,179,753 | A | * 12/1979 | Aronberg et al. | ................ 2/10 |
| 6,298,495 | B1 | * 10/2001 | Totani | ........................ 2/209.13 |
| 6,481,059 | B2 | * 11/2002 | Morris | ........................ 24/3.12 |

* cited by examiner

Primary Examiner—Hung Xuan Dang
(74) Attorney, Agent, or Firm—Edwin H. Crabtree; Ramon L. Pizarro; Donald W. Margolis

(57) ABSTRACT

A pair of eyeglass temple holders attached to opposite sides of a hat, a baseball cap and other types of headwear. The temple holders are releasably attached to ends of a pair of temples attached to a pair of eyeglasses, which eliminate the need of placing the ends of the temples on top of a wearer's ears. Each of the pair of eyeglass temple holders includes an elastic strap with a rear end of the strap attached to a rear of one side of the headwear. A front end of the elastic strap is attached to a temple fastener. The temple fastener is used for releasably engaging an end of a temple, which is part of a pair of eyeglasses. The temple fastener, in one embodiment, can be hollow plastic tube with one end inserted in a press fit into the end of the temple. The temple end fastener, in additional embodiments, can be hook and loop fasteners or a metal snap with a post received in a hole in the end of the temple. The elastic straps of the temple holders allows the eyeglasses to be moved from a resting position next to the sides and front of the headwear to a position in front of the wearer's eyes.

12 Claims, 2 Drawing Sheets

EYEGLASS TEMPLE HOLDERS FOR ATTACHING TO OPPOSITE SIDES OF HEADWEAR

BACKGROUND OF THE INVENTION (a) Field of the Invention

This invention relates to eyeglasses and headwear and more particularly, but not by way of limitation, to temple holders for eyeglasses. The temple holders are attached to opposite sides of a hat, a baseball cap and other types of headwear. Also, the temple holders are releasably attached to ends of a pair of temples attached to a pair of eyeglasses, thus eliminating the need of placing the ends of the temples on top of a wearer's ears.

(b) Discussion of Prior Art

Heretofore, there have been a variety of different types of hat fasteners for holding eyeglasses, safety glasses, sunglasses and the like on headwear. In U.S. Pat. No. 6,481,059 to Morris, a pair of wedge-shaped clips is disclosed for holding the frames of safety glasses next to the sides of a hat. In U.S. Pat. No. 6,298,495 to Totani, a pair of insertion holes is disposed on opposite sides of a hat. The insertion holes are used for receiving ends of temples, when a pair of glasses is received on top of a hat bill. In U.S. Pat. No. 6,282,721 to Travalgia, open slots or button holes are shown in opposite sides of headwear. The slots or holes are used for receiving ends of ear-pieces therethrough prior to the ear-pieces received on the wearer's ears. In U.S. Pat. No. 4,179,753 to Aronberg et al., a hat with eyeglasses support is described. The support is used for engaging the temples and nose-piece of the eyeglasses and holding the eyeglasses next to the sides and front of the hat.

None of the above mentioned prior art patents specifically disclose the unique features, structure and function of the subject eyeglass temple holders.

SUMMARY OF THE INVENTION

In view of the foregoing, it is a primary object of the invention to eliminate the need of holding on top of a wearer's ears the ends of a pair of eyeglass temples. The subject eyeglass temple holders are particularly important for use by a wearer with a missing ear, an injured ear or is affected by pressure placed on the side of the head by eyeglass temples.

Another objective of the invention is to hold a pair of eyeglasses securely next to the sides and front of selected headwear. The eyeglass temple holders are easily attached to various types and shapes of headwear.

Yet another object of the invention is using the eyeglass temple holders, eyeglasses can be quickly moved from next to the front of the headwear to in front of the wearer's eyes with a nose-piece of the eyeglasses resting on the wearer's nose.

Still another object of the eyeglass temple holders is the invention is readily adaptable to various types of headwear such as hats, baseball caps, stocking caps, hard hats and other types of head apparel.

Each of a pair of eyeglass temple holders includes an elastic strap with a rear end of the strap attached to a rear of one side of the headwear. A front end of the elastic strap is attached to a temple fastener. The temple fastener is used for releasably engaging an end of a temple, which is part of a pair of eyeglasses. The temple fastener, in one embodiment, can be hollow plastic tube with one end inserted in a press fit into the end of the temple. The temple end fastener, in additional embodiments, can be hook and loop fasteners or a metal snap with a post received in a hole in the end of the temple. The elastic straps of the temple holders allows the eyeglasses to be moved from a resting position next to the sides and front of the headwear to a position in front of the wearer's eyes.

These and other objects of the present invention will become apparent to those familiar with various types eyeglass holders used in conjunction with headwear when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the principles thereof, and in which.

DETAILED DESCRIPTION OF THE PREFERRED EMBODIMENTS

Figure 1:
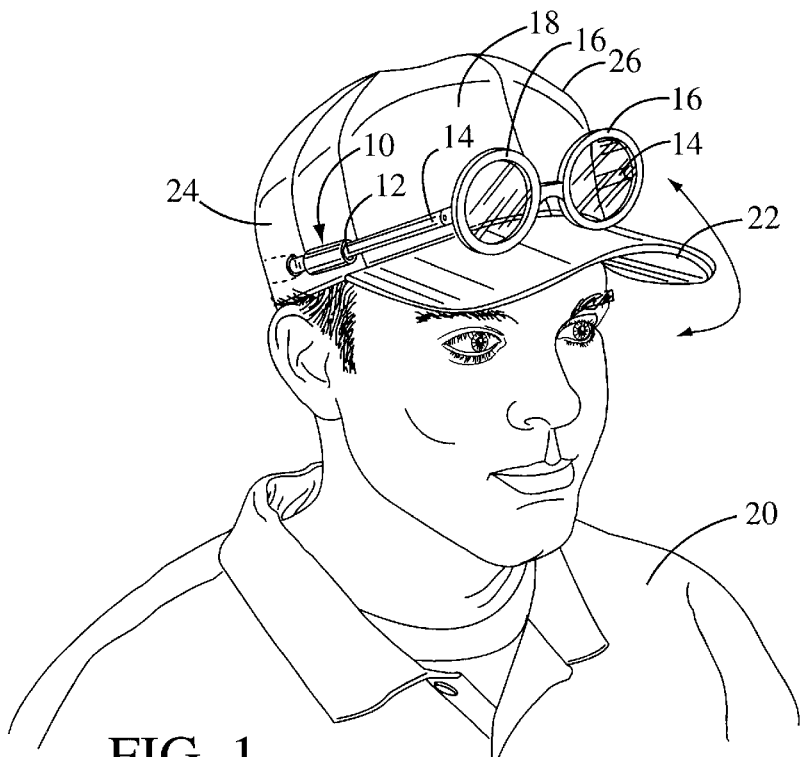
FIG. 1 is a perspective view of the subject eyeglass temple holders attached to ends of a pair of eyeglass temples, which are part of a pair of eyeglasses. The eyeglass temple holders are attached to the rear of opposite sides of headwear, such as a baseball cap. The baseball cap is shown being worn by a young male model with the eyeglasses resting on top of a cap bill.

In FIG. 1, a perspective view of one of the subject eyeglass temple holders is shown having general reference numeral 10. The eyeglass temple holders 10 are attached to an end 12 of eyeglass temples 14. The eyeglass temples 14 are attached to a pair of eyeglasses 16. The eyeglass temple holders 10 are attached to opposite sides of headwear, such as a baseball cap 18. The baseball cap 18 is shown being worn by a young male model 20 with the eyeglasses 16 resting on top of a cap bill 22. The eyeglass temple holders 10 come in a pair and are attached to a rear of one side 24 and an opposite side 26 of the baseball cap 18. It should mentioned that only one of the temple holders 10 is shown in drawings, with the other temple holder 10 hidden on the opposite side 26 of the cap 18. Obviously, the other half of the pair of temple holders 10 would be attached to the opposite side 26 of the cap 18 in the same manner as the holder 10 is attached to the side 24.

While the headwear is shown in the drawings as a baseball cap 18, it can be appreciated that various types of hats, caps and the like can be used in conjunction with the subject invention. The detailed structure and function of the eyeglass temple holder 10 is shown in greater detail in FIGS. 3–5.

Figure 2:
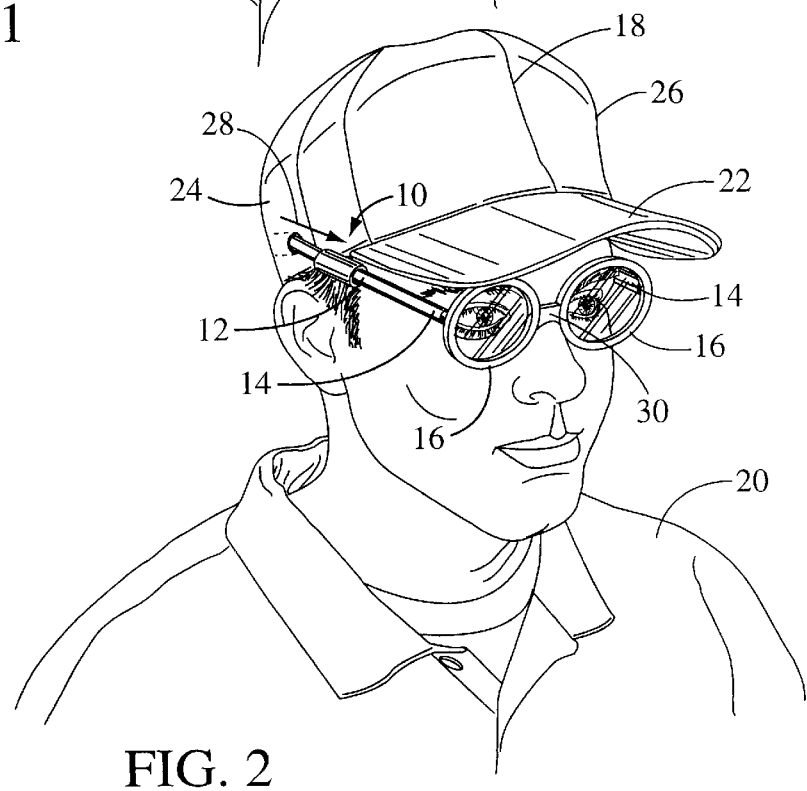
FIG. 2 is another perspective view of the eyeglass temple holders used for lowering the eyeglasses from a resting position on the cap bill to an "in use" position in from of the eyes of the male model.

In FIG. 2, another perspective view of the eyeglass temple holder 10 is shown. In this drawing, the temple holder 10 is used for lowering the eyeglasses 16 from a resting position on the cap bill 22 to an "in use" position in front of the eyes of the male model 20. In operation of the invention, the wearer of the cap 18 will grip a portion of the frame of the eyeglasses 16 and move the eyeglasses forward over the front of the cap bill 22. This movement stretches the temple holder 10 outwardly, as indicated by arrow 28. The eyeglasses 16 are then lowered in front of the eyes with a nosepiece 30 of the eyeglasses 16 resting on the nose of the wearer.

Figure 3:
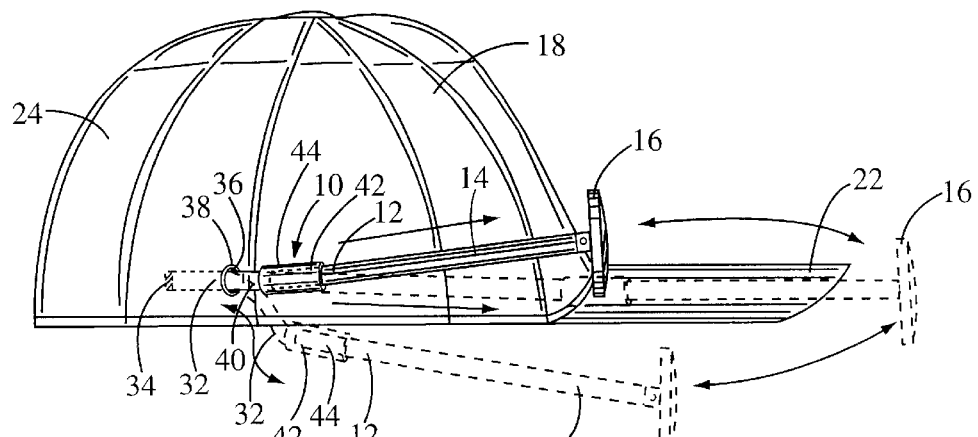
FIG. 3 is a side view of the eyeglass temple holders and pair of eyeglasses shown in a resting position on the cap bill and in dashed lines moved in front of the cap bill and then lowered downwardly into a position in front of the eyes of the wearer.

In FIG. 3, a side view of one of the eyeglass temple holders 10 is shown attached to the end 12 of one of the eyeglass temples 14. The pair eyeglasses 16 are shown in a resting position on top of the cap bill 22. The eyeglasses are also shown in dashed lines moved in front of the cap bill 22 and downwardly for receipt in front of the eyes of the wearer. Obviously, when the eyeglasses 16 are no longer needed by the wearer, the eyeglasses are moved forward and raised upwardly past the front of the cap bill 18 and returned to the resting position next to the front of the baseball cap 18.

Each of the two eyeglass temple holders 10 include an elastic strap 32, with a rear end 34 of the strap 32 received through an opening 36 in the side 24 or the opposite side 26 of the cap 18. The rear end 34 of the elastic strap 32 is stitched to the inside of the rear of the cap 18. The side of the opening 36 can be stitched like a buttonhole or attached to a grommet 38. A front end 40 of the elastic strap 32 is attached to one end of a temple fastener 42. The temple fastener 42, in this example, is a plastic tube 44 with an opposite of end used for releasably receiving the end 12 of the temple 14 therein and holding the end 12 in a press fit.

Figure 4:
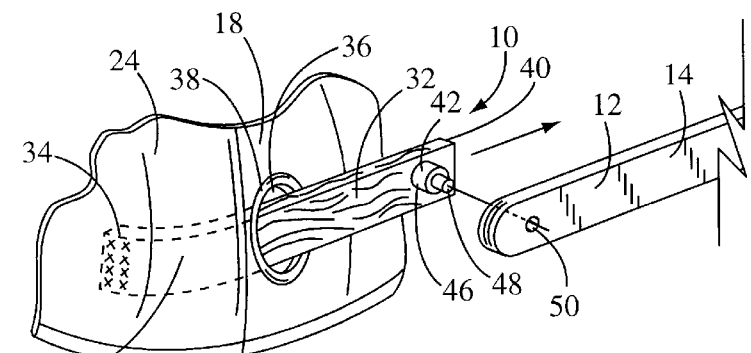
FIG. 4 is a perspective view of another embodiment of one of the eyeglass temple holders with a front end of an elastic strap having a metal snap thereon. A post, which is part of the snap, is positioned for receipt in a press fit into a hole drilled in the end of one of the eyeglass temples.

In FIG. 4, a perspective view of a portion of the side 24 of the cap 18 and an alternate embodiment of one of eyeglass temple holders 10 are shown. In this illustration, the front end 40 of the elastic strap 32 has a metal snap 46 thereon. A post 48, which is part of the snap 46, is positioned for receipt into a hole 50 drilled in the end 12 of one of the eyeglass temples 14. The post 48 is held in the hole 50 in a press fit.

Figure 5:
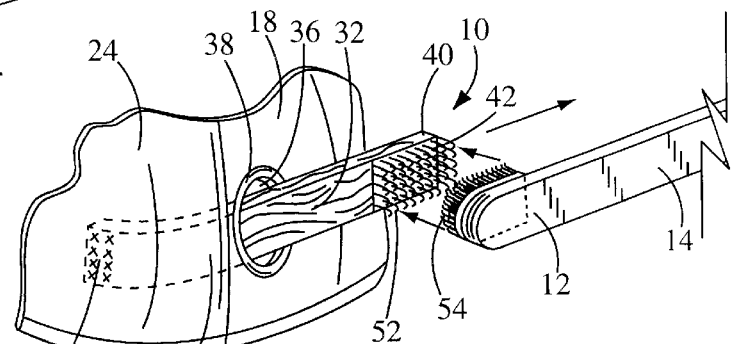
FIG. 5 is a perspective view of still another embodiment one of eyeglass temple holders with the front end of the elastic strap having a strip of loop material thereon. The loop material is used for releasably engaging hook material attached to the end of one of the eyeglass temples.

In FIG. 5, a perspective view of a portion of the side 24 of the cap 18 and still another embodiment of one of eyeglass temple holders 10 are shown. In this example, the front end 40 of the elastic strap 32 has a strip of loop material 52 thereon. The loop material 52 is used for releasably engaging hook material 54 attached to the end 12 of one of the eyeglass temples 14. The loop and hook material 52 and 54 provide for adjustment of the end 12 of the temple 14 along the front end 40 of the strap 32.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

1. A pair of eyeglass temple holders for attaching to opposite sides of headwear and holding ends of two temples attached to eyeglasses, each of the temple holders comprising:

an elastic strap, a rear end of said strap adapted for attachment to a side of the headwear; and a temple fastener, a front end of said elastic strap attached to said temple fastener, said temple fastener adapted for releasably engaging an end of the temple.

2. The temple holder as described in claim 1 wherein said temple fastener is a plastic tube, one end of said plastic tube attached to the front end of said elastic strap, an opposite end of said plastic tube adapted for receiving the end of the temple therein.

3. The temple holder as described in claim 1 wherein said temple fastener is a metal snap attached to the front end of said elastic strap, said metal snap having a post extending outwardly therefrom, said post adapted for receipt in a hole in the end of the temple.

4. The temple holder as described in claim 1 wherein said temple fastener are hook and loop fasteners, said loop fasteners attached to the front end of said elastic strap, said hook fasteners adapted for attachment on the end of the temple.

5. A pair of eyeglass temple holders for receipt in holes in opposite sides of headwear and for attaching to the rear of opposite sides of the headwear, the temple holders for holding ends of two temples attached to eyeglasses, each of the temple holders comprising:

an elastic strap, a rear end of said strap adapted for receipt through the hole in the side of the headwear and adapted for attachment to the side of the headwear; and a temple fastener, a front end of said elastic strap attached to said temple fastener, said temple fastener adapted for releasably engaging an end of the temple.

6. The temple holder as described in claim 5 wherein said temple fastener is a plastic tube, one end of said plastic tube attached to the front end of said elastic strap, an opposite end of said plastic tube adapted for receiving the end of the temple therein in a press fit.

7. The temple holder as described in claim 5 wherein said temple fastener is a metal snap attached to the front end of said elastic strap, said metal snap having a post extending outwardly therefrom, said post dimensioned for receipt in a hole in the end of the temple in a press fit.

8. The temple holder as described in claim 5 wherein said temple fastener are hook and loop fasteners, said loop fasteners attached to the front end of said elastic strap, said hook fasteners adapted for attachment on the end of the temple, said hook and loop fasteners providing adjustment of the end of the temple along the front end of said elastic strap.

9. A pair of eyeglass temple holders, for receipt in holes in opposite sides of headwear and for attaching to the rear of opposite sides of the headwear, the temple holders for holding ends of two temples attached to eyeglasses, each of the temple holders comprising:

an elastic strap, a rear end of said strap dimensioned for and adapted for receipt through a grommet disposed around the hole in the side of the headwear, the rear end of said strap adapted for stitching to a rear of the side of the headwear; and a temple fastener, a front end of said elastic strap attached to said temple fastener, said temple fastener adapted for releasably engaging an end of the temple.

10. The temple holder as described in claim 9 wherein said temple fastener is a plastic tube, one end of said plastic tube attached to the front end of said elastic strap, an opposite end of said plastic tube adapted for receiving the end of the temple therein in a press fit.

11. The temple holder as described in claim 9 wherein said temple fastener is a metal snap attached to the front end of said elastic strap, said metal snap having a post extending outwardly therefrom, said post dimensioned for receipt in a hole in the end of the temple in a press fit.

12. The temple holder as described in claim 9 wherein said temple fastener are hook and loop fasteners, said loop fasteners attached to the front end of said elastic strap, said hook fasteners adapted for attachment on the end of the temple, said hook and loop fasteners providing adjustment of the end of the temple along the front end of said elastic strap.

* * * * *